June 7, 1938.                M. V. GREEN                2,119,811
                       RESILIENT INDUCTION MAGNET
                        Filed Aug. 20, 1935          4 Sheets-Sheet 2

INVENTOR.
Mason V. Green
BY
Myron J. Dikeman
ATTORNEY.

June 7, 1938. M. V. GREEN 2,119,811
RESILIENT INDUCTION MAGNET
Filed Aug. 20, 1935 4 Sheets-Sheet 3
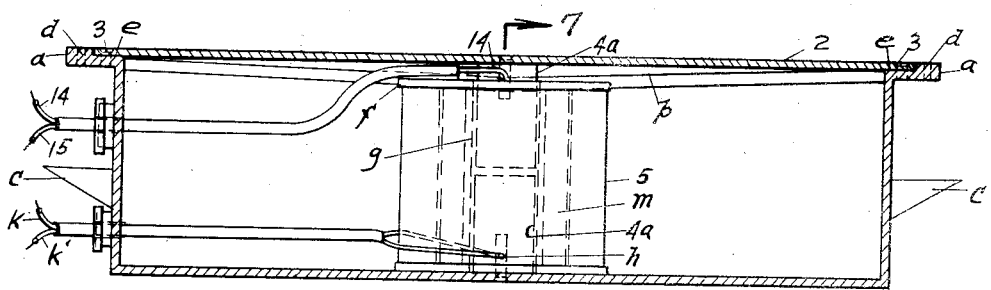
Fig. 6
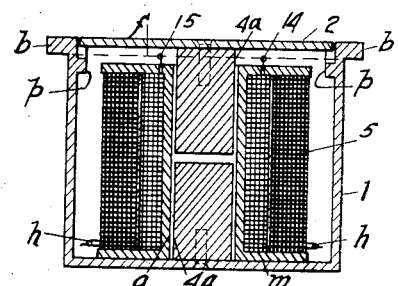
Fig. 7
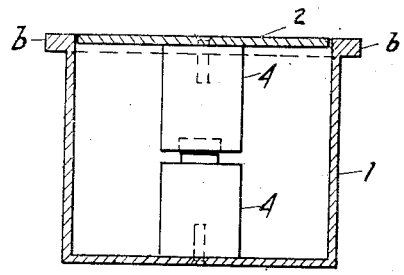
Fig. 8
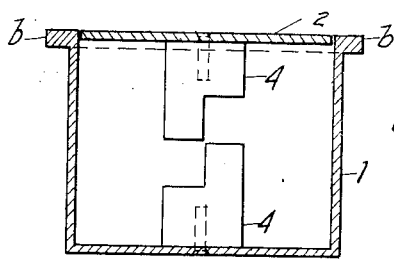
Fig. 9
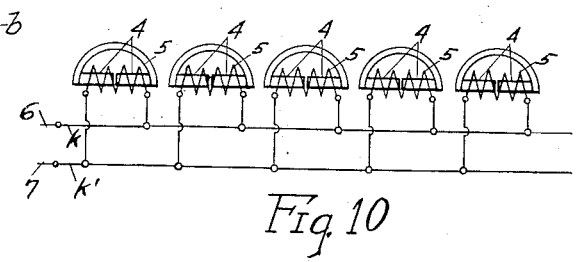
Fig. 10
Fig. 11
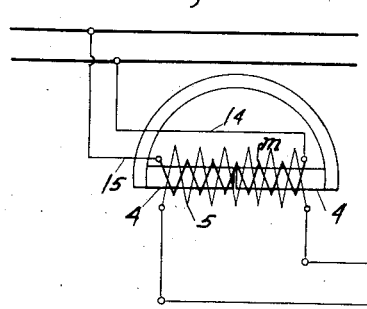
Fig. 12
INVENTOR.
Mason V. Green
BY Myron J Dikeman
ATTORNEY.

June 7, 1938.  M. V. GREEN  2,119,811
RESILIENT INDUCTION MAGNET
Filed Aug. 20, 1935  4 Sheets-Sheet 4

INVENTOR.
BY Mason V. Green
Myron J. Dikeman
ATTORNEY.

Patented June 7, 1938

2,119,811

UNITED STATES PATENT OFFICE 2,119,811

RESILIENT INDUCTION MAGNET

Mason V. Green, Lansing, Mich., assignor to Frank D. Hayes, Lansing, Mich., trustee for F. D. Hayes Electric Company Application August 20, 1935, Serial No. 36,998

7 Claims. (Cl. 171—209)

My invention relates to a magnetic induction unit, and is a modification of the impulse unit described in my former patent application, Serial No. 743,490, filed Sept. 10, 1934, and may be substituted therefor in said invention.

The object of my invention is to produce a sensitive induction magnet for operating, electrically, a connected sensitive electric instrument whenever the magnetic field is broken or disturbed, and without any external electric circuit.

Another object is to produce a magnetic impulse unit that will automatically disturb its own magnetic field whenever subjected to any superimposed load thereon, and produce an induced electric current through any connected electric circuit.

A further object is to produce a magnetic induction unit suitable for embedding within a pavement or highway surface, for operating a connected traffic signal or tabulating device, by the passing of any vehicle thereover.

A still further object is to produce a resilient, electric impulse unit that is simple in construction, easily and efficiently installed and operated and that can be manufactured at a very low cost.

These several objects are attained in the preferred form by the construction and arrangement of parts more fully hereinafter set forth.

Similar parts on all drawings are marked by similar numerals or letters.

Fig. 6 is another similar sectional view of a modification, showing a further modified coil winding for the magnet unit.

Fig. 7 is a cross-sectional view taken on the line 7—7 of the Fig. 6, showing the general arrangement of the poles and modified coil windings.

Figs. 8 and 9 are cross-sections taken through the box casing as on the line 8—8 of the Fig. 5, with the induction unit omitted, showing modified forms for the magnet pole ends.

Fig. 10 is a wiring diagram showing the assembled magnet induction units all connected within a parallel circuit.

Fig. 11 is a modified wiring diagram showing the same induction units as connected within a series circuit.

Fig. 12 is a wiring diagram showing a single magnet unit with coil comprising both primary and secondary windings, each connected in its respective circuit.

Figure 1:
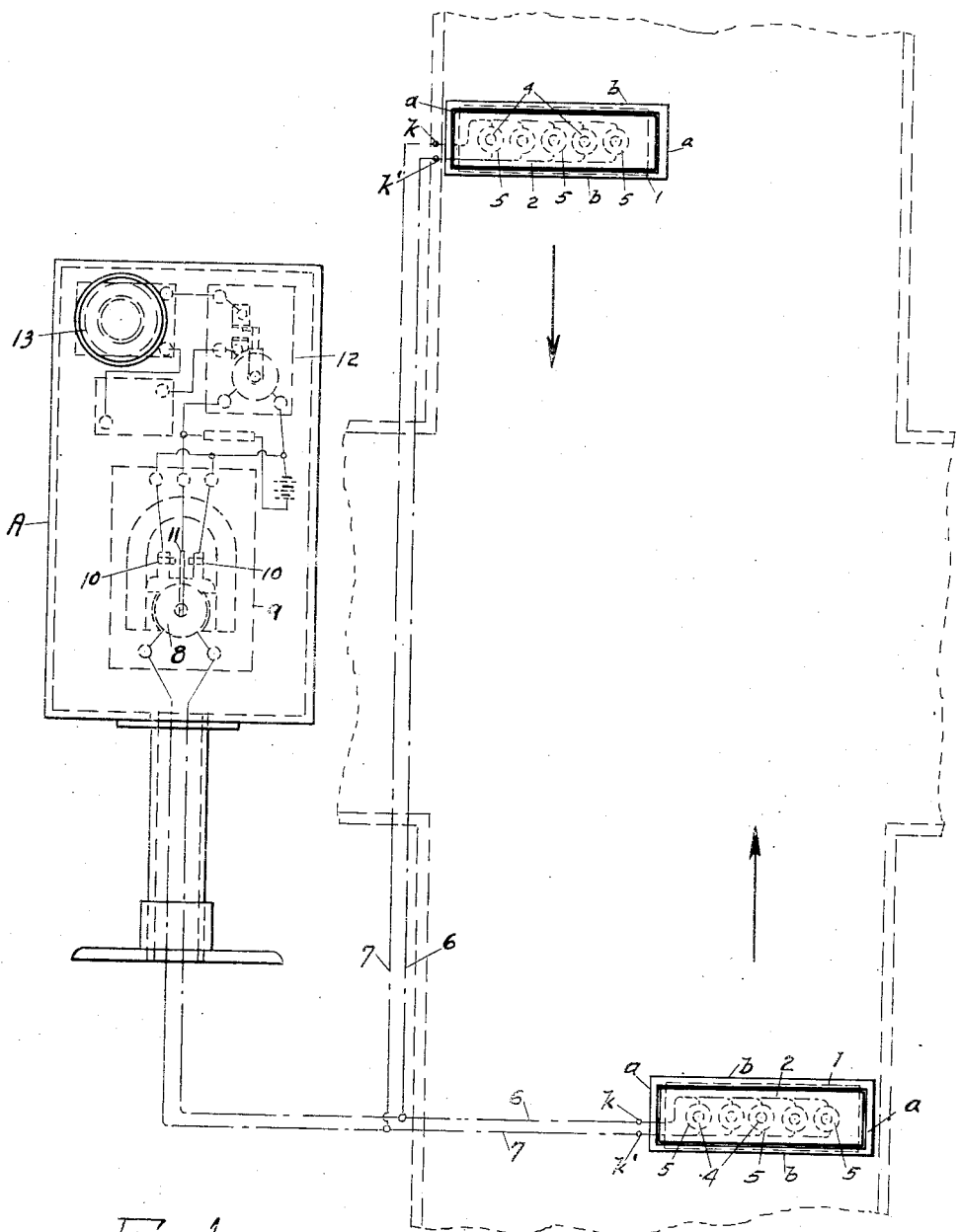
Fig. 1 is a plan view showing my magnetic unit as installed in a street pavement, on opposite sides of a street intersection, and illustrating the device as electrically connected with a street signal lamp.

This invention is based on a principle similar to the impulse unit of my former device previously mentioned, that a magnetic field may be created by induction coil winding about a bar of suitable metal, when an electric current is passed through the coil, and if said bar is hard iron or steel it will retain its magnetic field and properties after the electric current is discontinued. Thereafter, should the magnetic lines of force be broken or disturbed, or the magnetic flux density changed, it will generate an induced electric current within the induction winding coils which will flow through any connected circuit with sufficient strength to deflect, temporarily, a connected sensitive electric instrument.

In general, my device comprises, in principle, a horseshoe magnet, or series of magnets, designed with their respective opposite pole ends adjacent each other but slightly separated, said magnet, or magnets, being of a resilient frame structure that may be easily deflected as any load is placed thereon, for varying the pole distances and automatically disturb the magnetic field, or intensify the magnetic flux. This is accomplished by an elongated closed metal box having a resilient cover mounted thereon, and provided with magnet bar plugs mounted on both cover and base, arranged vertically in pairs with opposite pole ends adjacent but slightly separated. An induction coil winding is mounted over each pair of magnet pole ends, and all coils connected within a common circuit either in parallel or series.

My resilient induction magnet is herein illustrated as applied for operating an electric street signal device, the magnet box being installed at chosen sections of the street or highway, approaching a street intersection, each unit being embedded in the pavement in the direct line of travel, and with the unit covers flush with the pavement surface, the induction coil units being connected with the signal light. It is to be understood, however, that this device as shown and claimed may be used for any other purpose, and for operating any connected electric impulse instrument when the resilient induction magnet unit may be so placed to receive any intermittent deflecting load on the resilient cover member.

I will now describe more fully the detailed construction of my device, referring to the drawings and the marks thereon, but more specifically referring to the structure illustrated in the Figs. 2 to 5 of the drawings as the preferred design, and with the remaining figures as modifications thereof.

Figure 13:
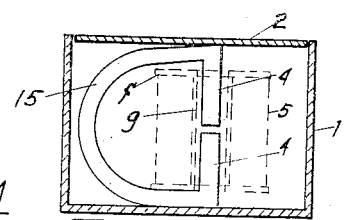
Fig. 13 illustrates a modified magnet construction.
Figure 14:
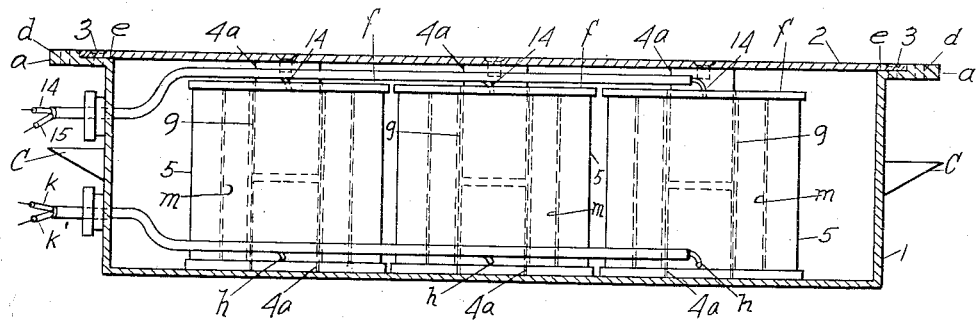
Fig. 14 is a sectional view of a modification, similar to Fig. 6, showing like multiple units installed within the casing.

The box casing 1 is preferably made of cast metal, of an elongated, rectangular design, open at the top, said casing being formed with projecting horizontal flanges $a$ and $b$ surrounding the entire top opening, designed to be positioned flush with the street surface when the casing is embedded within the pavement as illustrated in Fig. 1. The casing 1 may be formed with suitable anchors $c$ cast thereon, or the flanges may be provided with suitable anchor holes $d$ for anchor bolts, or any other means for fixedly installing said casing in any roadway or pavement subject to heavy traffic. The casing end flanges $a$ are preferably made with suitable cover recesses $e$, and receive therein a cover plate 2 designed to fit and fill the casing top opening, and preferably unsupported along opposite side walls as shown in the Fig. 4. The cover plate 2 is made of some suitable resilient material such as a steel plate, and of sufficient strength to support any traffic load that may be driven thereover, but subject to a slight deflection between the supporting casing ends. The cover 2 may also be supported in its deflected position, by special curved side ribs $p$, if desired, as illustrated in Figs. 6 and 7. The cover 2 is attached to the end casing flanges $a$ by means of screws or bolts 3, or any other suitable means, but capable of slight deflection through its center section. Short plug permanent magnets 4 made of suitable magnetic material, preferably of hard steel, cylindrical in form, are mounted along the box centerline on both the cover plate 2 and the casing bottom and fixedly attached thereto. The said plug magnets are arranged in pairs positioned vertically one above the other, and in alignment lengthwise the casing, each pair with their respective opposite pole ends adjacent, but slightly separated and all in the same pole direction as indicated in the Figs. 2 and 4 of the drawings, the space between the pole ends being sufficient to allow for a predetermined deflection of the cover plate 2 before contact is formed therebetween. Around each pair of the vertically positioned plug magnets 4 is mounted an induction coil unit 5, formed of numerous turns of continuous fine insulated wire, preferably wound on a spool shell $f$ of some suitable insulating material, said induction unit 5 being fixedly mounted on the casing bottom by any suitable means. Each induction unit 5 is formed with a central cylindrical opening $g$ concentric with the spool axis, and of a diameter slightly larger than the upper plug magnet, and of a length less than the depth of the casing box, sufficient to allow the full cover deflection without contact therewith. The upper magnet plugs 4 are free to adjust position within its respective induction unit 5 as the supporting cover plate 2 is deflected under any load, and without contacting its walls. The terminal wires $h$ of the respective induction units 5 are all connected together either in parallel or in series as indicated in the wiring diagrams 10 and 11, and the common terminals $k$ and $k'$ suitably arranged for connecting the assembled units within any electric circuit, and is herein illustrated as connected by the circuit wires 6 and 7 to an energizing coil 8 of a sensitive polarized relay instrument 9. This relay 9 is provided with external circuit contact members 10 and 11, normally open and operative with said coil, said terminal contact members being connected with a separated electric circuit leading through an auxiliary relay 12 and to a light signal unit 13, all installed within a street signal unit A at a street intersection as shown in the Fig. 1. As many pairs of plug magnets 4 with corresponding induction units 5, may be installed within a casing 1 as are necessary to produce the required induced current for operating the connected electric instrument with which the resilient induction magnet is to be used. The plug magnets 4 may, if desired, be constructed with a U-shaped side bar section 15, forming a horseshoe magnet design, and mounted within the casing 1 with the upper magnet arm contacting the resilient cover plate 2, as illustrated in the Fig. 13. The operation is the same as in the previously described construction.

Figure 2:
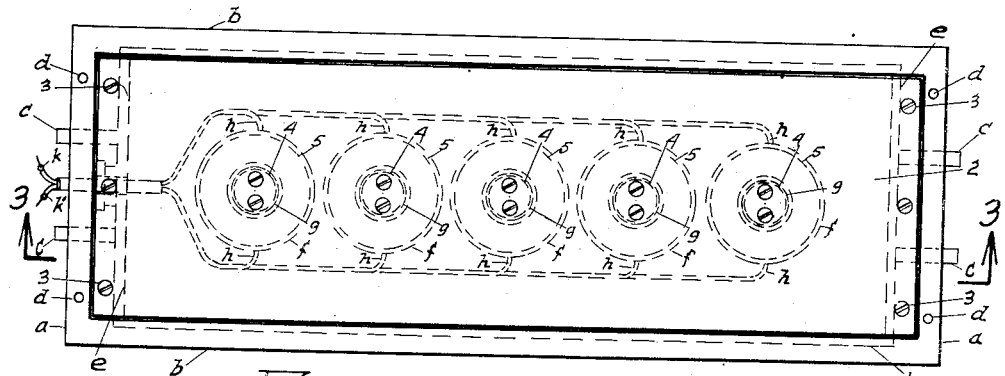
Fig. 2 is a top view of the magnet box showing the resilient cover plate mounted thereon, and the relative position of the inclosed magnets.
Figure 3:
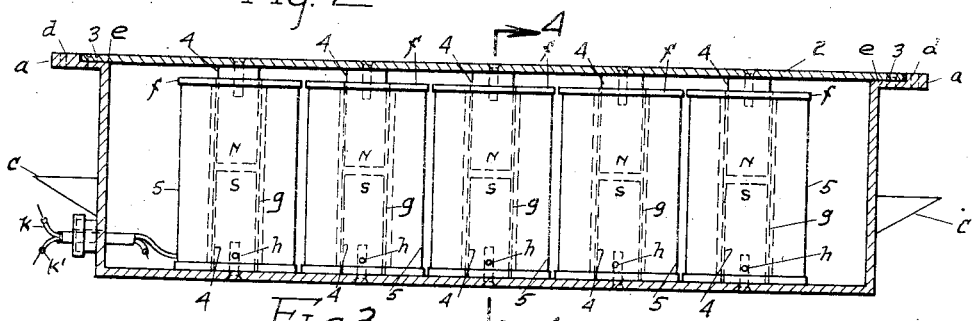
Fig. 3 is a vertical sectional view lengthwise of the box casing, taken on the line 3—3 of the Fig. 2 showing the general arrangement of the magnetic poles and surrounding induction units.
Figure 5:
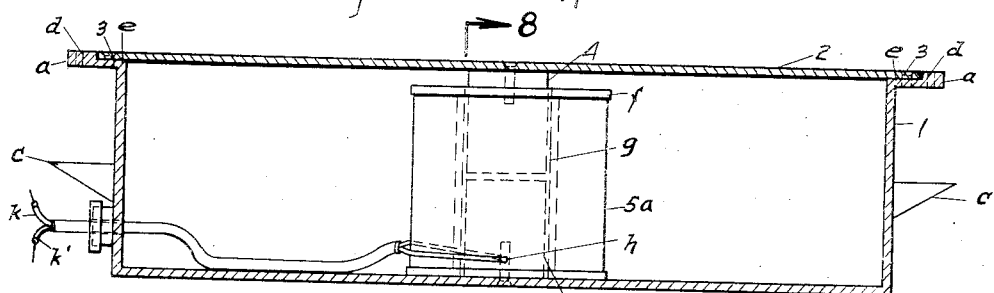
Fig. 5 is a sectional view of a modification, similar to Fig. 3, showing a modified magnetic unit comprising only a single enlarged pole and coil sections.
Figure 4:
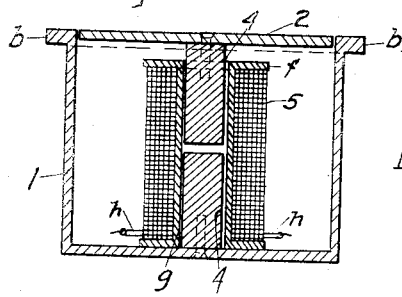
Fig. 4 is a cross-sectional view taken on the line 4—4 of the Fig. 3 showing the assembled poles and the surrounding coil winding.

The Figs. 2 and 3 show one of the preferred types of units comprising five magnet field cells, although it is to be understood that any other number of cells, more or less, may be used equally as well, depending upon the requirement of the unit. In some cases a single enlarged magnet cell $5a$ may be used, if desired, to produce the required induced current, as illustrated in the Fig. 5 of the drawings. The operation and application is the same in either case.

When my resilient induction magnet is properly installed within a street pavement, or any line of travel, with the resilient cover plate 2 flush with the street surface, and with the induction winding terminals $k$ and $k'$ connected to the sensitive instrument 9 properly adjusted, any deflection of the cover plate 2, however slight, caused by a passing vehicle, will change the relative positions of adjacent magnet pole ends, increasing the magnetic flux density, and generate an induced electric current within the induction unit 5, and of sufficient strength to operate the relay 9 for closing its contact terminals 10 and 11, and which in turn closes the circuit leading to the signal light unit 13. The magnet impulse is only momentary and during the passing of the vehicle.

A further modification of my device is illustrated in the Figs. 6 and 7 and 12 of the drawings, showing the winding of the induction unit 5 preceded by a primary coil winding $m$ connected by intervening circuit wires 14 and 15 in an electric charging circuit as indicated by the wiring diagram shown in Fig. 12. In this construction, the plug magnets $4a$ may be made of soft metal suitable for magnets, the existing magnetic field being generated and maintained by the constant flow of electric current through the primary coil $m$. The remaining construction and operation is exactly the same as in the former case.

The Figs. 8 and 9 illustrate various modifications of the adjacent magnet ends, showing the plug and recess type in the Fig. 8, and the overlapping ends in the Fig. 9. These special pole ends are effective for a more sensitive magnetic unit as the full gap between the pole ends is never affected, due to the adjacent pole corners. The operation is the same as in the former cases.

Having fully described my resilient induction magnet, what I claim as my invention and desire to secure by Letters Patent is:

1. An induction magnet adapted for generating an induced electric current for operating connected electric instruments and used therewith, comprising a suitable casing provided with a resilient cover section, series of magnet units having adjacent opposite pole ends mounted within the said casing and positioned to engage both the casing wall and the resilient cover section and capable of adjustment of the magnet pole positions by the cover deflection, an induction winding unit on each pair of adjacent magnet pole ends and arranged with their respective terminals connected in a common circuit.

2. A resilient induction magnet adapted for generating an induced electric current for operating connected electric instruments and used therewith, comprising an elongated metal box casing provided with a resilient cover section, a series of plug magnet units arranged in pairs with adjacent opposite pole ends slightly separated, vertically mounted within the casing and with their opposite poles attached to the casing bottom and cover section respectively, induction winding surrounding each pair of adjacent magnet pole ends and arranged with their respective terminals connected in a common circuit.

3. A resilient induction magnet adapted for generating an induced electric current for operating connected electric instruments and used therewith, comprising an elongated metal box casing open at the top and provided with a resilient cover section mounted over said casing opening, series of pairs of permanent plug magnets mounted within the casing, each pair positioned vertically one above the other with their adjacent opposite pole ends slightly separated, all arranged in alignment along the casing centerline, with their outer ends contacting and fixedly attached to the casing bottom and resilient cover section respectively, an induction coil unit mounted over each pair of adjacent magnet pole ends, and means provided for connecting their respective coil terminals in a common instrument circuit.

4. An induction magnet adapted for generating an induced electric current suitable for operating connected sensitive electric instruments and used therewith, comprising a suitable box casing having a resilient cover section mounted thereon, a magnet unit having adjacent opposite pole ends slightly separated vertically mounted within the casing, positioned to contact both casing bottom and cover section in a manner capable of adjustment of the relative pole positions by the cover deflections, a primary coil winding mounted over said adjacent pole ends and connected within an electric charging circuit, an induction coil winding mounted over said primary coil and arranged for connecting its respective terminals within an instrument circuit.

5. A resilient induction magnet adapted for generating an induced electric current for operating connected sensitive electric instruments and used therewith, comprising a suitable elongated box casing having a resilient cover section mounted thereon, a series of magnet units with opposite pole ends slightly separated, vertically mounted within the casing positioned to contact the casing bottom and resilient cover section in a manner capable of adjustment of the pole positions by the resilient cover deflections, a primary coil winding surrounding each of the series of adjacent magnet pole ends, each coil being connected within an electric charging circuit, an induction coil winding surrounding each of said primary coils, said induction winding being formed for connecting their respective terminals in a common instrument circuit.

6. An induction magnet adapted for generating an induced electric current for operating connected electric instruments and used therewith, comprising an elongated metal box casing open at the top and provided with a resilient cover section mounted over said opening, a pair of plug magnets mounted within said casing near the center thereof, positioned vertically one above the other with adjacent opposite pole ends slightly separated and with the outer pole ends contacted and attached to the casing bottom and cover section respectively, a primary coil winding mounted over said adjacent pole ends and connected in an electric charging circuit, an induction coil winding mounted over the primary coil winding and arranged for connecting its respective terminals in an electric instrument circuit.

7. A resilient induction magnet adapted for generating an induced electric current for operating connected sensitive electric instruments and used therewith, comprising an elongated metal box casing with open top and provided with a detachable cover section mounted thereover, series of pairs of plug magnet units mounted within the casing, each pair positioned vertically one above the other with their adjacent magnet pole ends slightly separated, all arranged along the casing center line and with their outer pole ends contacted and attached to said casing bottom and resilient cover section respectively, a primary coil winding mounted over each pair of adjacent magnet pole ends and each connected within an electric charging circuit, and an induction coil winding mounted over each primary coil and arranged for connecting their respective coil terminals in a common instrument circuit.

MASON V. GREEN.